April 30, 1968     N. W. DONNER     3,380,186
MINNOW BUCKET
Filed Aug. 23, 1965                                                      2 Sheets-Sheet 1
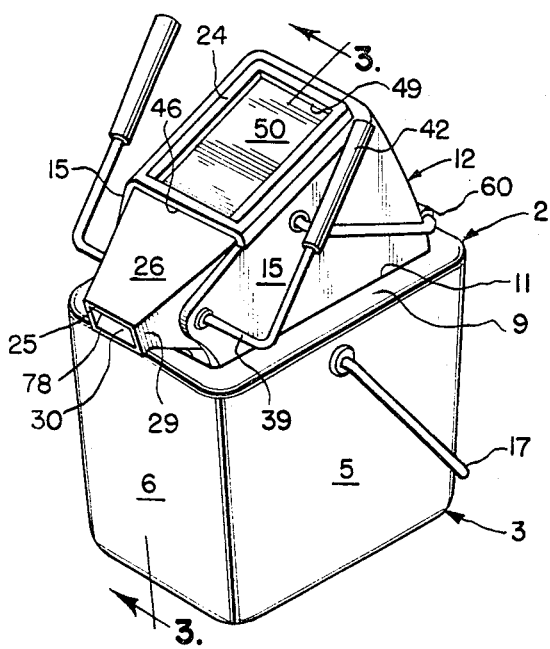
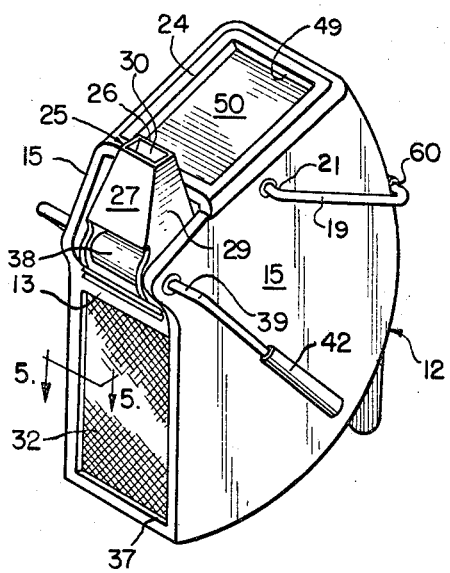
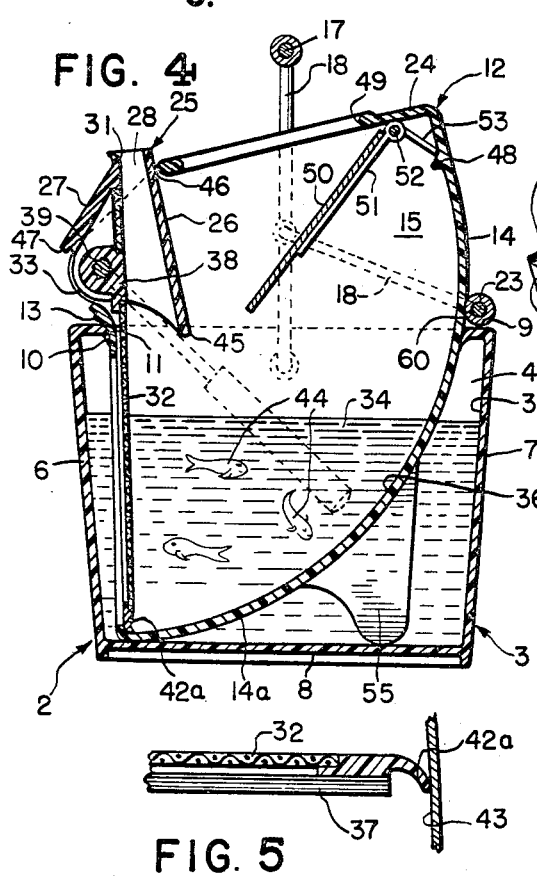
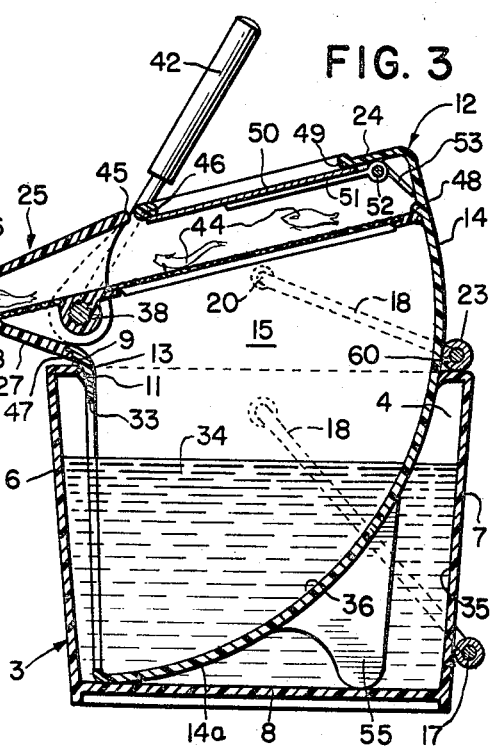
*INVENTOR.*
Norman W. Donner
BY
John J. Kowalik
Attorney April 30, 1968 N. W. DONNER 3,380,186
MINNOW BUCKET
Filed Aug. 23, 1965 2 Sheets-Sheet 2

INVENTOR.
Norman W. Donner
BY
John J. Kowalik
Attorney

United States Patent Office 3,380,186
Patented Apr. 30, 1968

3,380,186
MINNOW BUCKET
Norman W. Donner, 3807 S. Maplewood Ave.,
Chicago, Ill. 60618
Filed Aug. 23, 1965, Ser. No. 481,843
10 Claims. (Cl. 43—56)

ABSTRACT OF THE DISCLOSURE

A minnow bucket comprising inner and outer containers, a screen pivotally connected to the inner container, a spout at one end of the screen, and mechanism for tilting the screen to net the minnows out of the inner container and gravitate them to the spout to meter the minnows into the user's hand, the spout being tilted to return any minnows therein into the inner container upon the screen being pivoted into the inner container to return the minnows thereinto.

---

This invention relates to buckets or containers for bait minnows.

Minnow buckets are in general use among fishermen and in general comprise inner and outer containers, the inner container being perforate and the outer being imperforate for holding the water. Buckets currently in use require the fisherman to reach into the inner container either with a net or hand and catch the elusive minnow. If the fishing at the moment happens to be good this procedure becomes frustrating and time consuming so that the fish are lost.

A general object of the invention is to provide a novel minnow bucket which is of novel and efficient construction facilitating catching of the bait.

A more specific object is to provide a minnow bucket with novel means for netting the minnows and metering them individually to the user and wherein the excess minnows are quickly returnable into the water.

These and other objects and advantages inherent in the invention will become readily apparent from the specifications and the drawings, wherein:

FIGURE 1 is a perspective view of one form of my novel bucket;

FIGURE 2 is a perspective view of the inner container;

FIGURE 3 is a cross sectional view on an enlarged scale taken substantially on line 3—3 of FIG. 1 with the unit in dispensing position;

FIGURE 4 is a view similar to FIGURE 3 showing the bucket in normal position;

FIGURE 5 is an enlarged fragmentary section on line 5—5 of FIG. 2;

Figure 6:
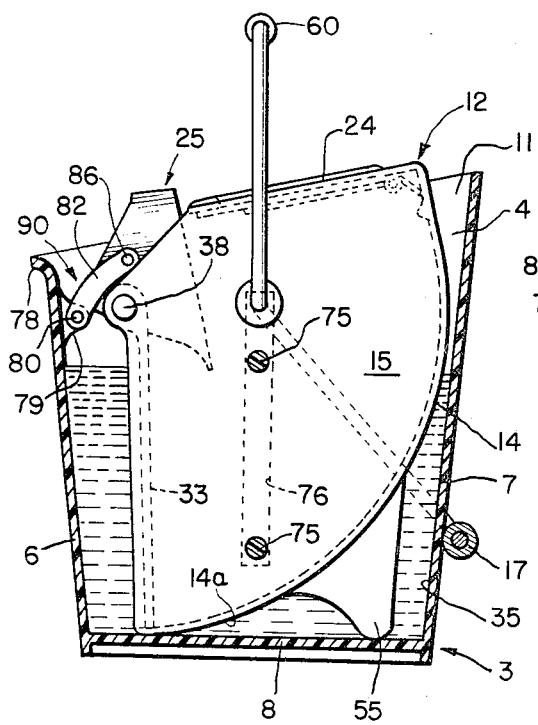
FIGURES 6–9 illustrate another embodiment of my invention.
Figure 7:
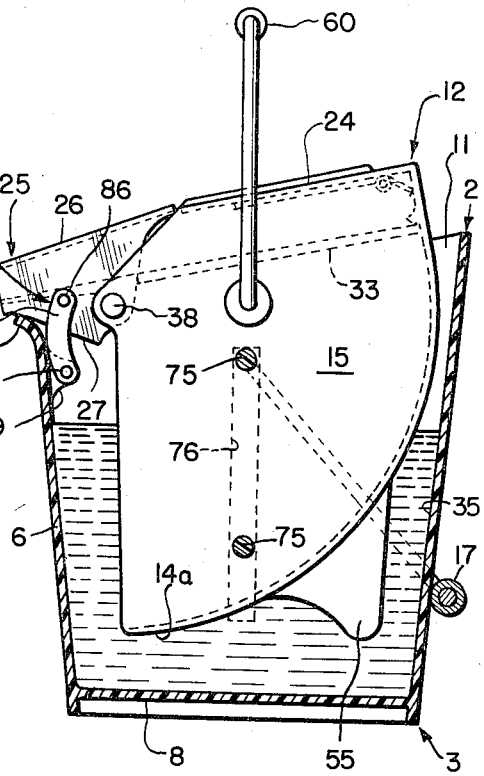

FIGURE 6 being a vertical cross-sectional view with the parts in lowered position;

FIGURE 7 being similar to FIG. 6 with the device in dispensing position, and

Figure 8:
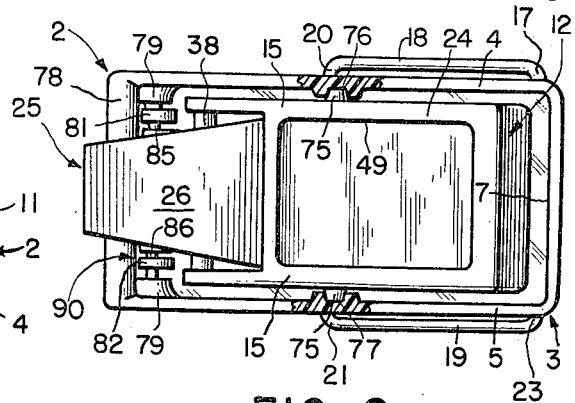

FIGURE 8 being a top plan with parts shown in horizontal section; and

Figure 9:
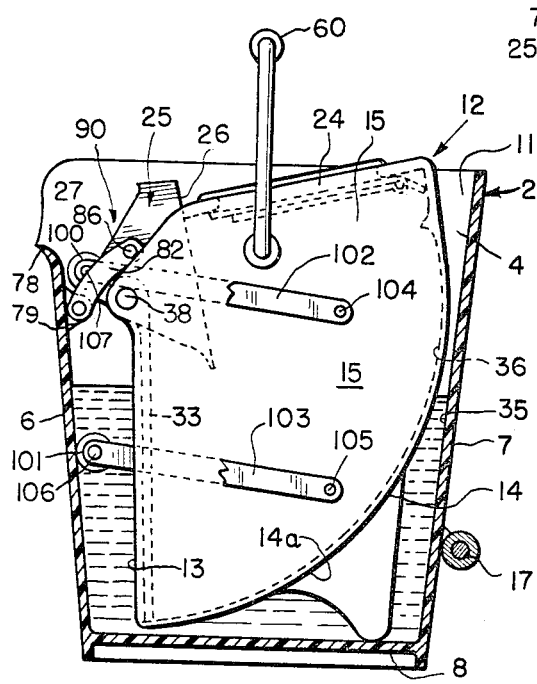

FIGURE 9 a partial vertical section of still another embodiment.

Description of Figures 1–5

The minnow bucket generally designated 2 comprises an outer quadrilateral container 3 having side walls 4, 5 end walls 6, 7 and a bottom 8. In this embodiment an inturned flange 9 is provided about the upper edges of the walls 4–7 with a flexible tapered peripheral edge portion 10 which defines an upper opening 11 through which there is inserted an inner bucket 12 which deflects the flange portion 10 downwardly upon insertion, said portion tightly embracing the front and rear wall portions 13, 14 and side wall portions 15, 15 of the inner container for sealing the same to prevent water from slopping out when the bucket is carried by the handle 17 which has a bail with side legs 18, 19 having lower inturned ends pivoted at 20, 21, the upper ends of legs 18, 19 being connected by a bight 23 which extends over the top wall 24 of the inner bucket 12.

The inner bucket comprises a spout or dispenser 25 which is of funnel shape having top and bottom webs 26, 27 as seen in FIG. 3, a pair of side webs 28 and 29 defining a narrow outlet 30 and a wide inlet 31.

Between the webs 26, 27 there is provided a relatively flat netting screen 32 which as seen in FIGURE 4 extends vertically closing the opening 33 in the front wall 13 of the inner bucket and affording communication of the water 34 from the interior 35 of the outer bucket to the interior 36 of the inner bucket.

The frame 37 which edges the screen 32 is connected adjacent to the upper end of the screen to a sleeve 38 which is connected to a shaft 39, of a handle 42, said shaft 39 extending through pivot openings 40 in the extensions 41 of the side walls 15. The shaft 39 is connected at each end to angularly extending handles which swing along the sides of the outer bucket. The lower edge of the screen frame 37 is connected to a flexible, elastomer or plastic, such as nylon or polyethylene, etc. scraper 42a which engages the curved or arcuate inner side 43 of the inner container wall portion 14 which has a lower portion 14a extending to the lower edge of the front wall 13 and merges therewith. It will be understood that the entire structure may be of plastic, though it is preferred that the screen, its edging frame and the shafts be of metal.

The upper wall 24 of the inner container slopes downwardly and forwardly generally parallel (though this is not necessary) to the screen 32 when it is in dumping or dispensing position after having been swung upwardly by the handle 42 from the position of FIG. 4 whereupon the fish 44 are netted by the screen and in flopping about gravitate down the inclined screen through the inlet opening in the spout while the rear edge 45 of the upper web 26 clears the front edge 46 of the upper wall 24 of the inner bucket and aligns therewith. In such dispensing position, the notched free edge 47 of the web 27 fits into the notched forwardly and upwardly curved upper portion of the front wall 13 of the inner container to provide a drain incline into the bucket.

The upward swing of the screen is limited by an abutment stop or rib 48 on the interior of the rear web 14 adjacent to its upper edge. The top wall 24 is provided with an opening 49 which is normally closed by a flap gate 50 which is larger than opening 49 and at its rear edge is provided with a hinge 51 and a pin 52 secured to side walls 15. The gate is pivoted or biased upwardly by a torsion 53 spring sleeved on pin 52 and reacting between flap 50 and the interior of the rear wall 14.

Th bottom of the wall portion 14 is provided with a dependent leg 55 which serves with the front edge of the lower wall portion 14a of wall 14 as a stand for the inner bucket when removed by handle 60 and as a support within the outer bucket.

Description of Figures 6–8

The device shown in FIGURES 6–8 is essentially the same as that of the previous embodiment and like parts are identified by corresponding reference numerals.

In this structure the side walls 15, 15 of the inner container 12 are provided with external guide bosses or gibs 75, 75 which are admitted into vertically elongated slots 76, 77 in walls 4, 5 of the outer container 3. The front wall 6 is provided adjacent to its upper end wit h a lip 78 and below the lip 78 there are provided lugs or ears 79 which mount a horizontal pin 80 upon which pivot the lower ends of links 81, 82, said links flanking the spout 25 and having their upper ends pivoted on horizontal pins 85, 86 extending from opposite side walls 28, 29 of the spout. Thus when the handle 60 is lifted, lifting the container 12 the container will be guided in slots 76, 77 and the links 81, 82 of the operating linkage 90 will cause the spout and screen to assume dispensing position as shown in FIGURE 7.

Description of Figure 9

The invention shown in FIGURE 9 is similar to that of the previous embodiments and parts which are identical to those of the previous embodiments are identified with the same reference characters. In this structure the slot and guide arrangement is substituted by parallel links 100, 101, 102, 103, said links being pivoted at their rear ends as at 104, 105 to the side walls 15 of the inner container and at their forward ends to the side walls of the outer container as at 106, 107 adjacent to its front wall.

As the inner bucket is lifted it is guided by the links vertically while the operating linkage swings the spout and screen as shown in FIGURE 7.

I claim:

1. A minnow bucket comprising a container for minnows with water therein, netting means pivotally mounted on a generally horizontal axis at one end at one side of the container, said container comprising a curved wall concentric with said axis of pivot and forming a bottom and opposite side of said container, said netting means having a lowered position within the container adjacent to said one side thereof and having its opposite end adjacent to said curved wall, said netting means extending across substantially the entire width of the container and being swingable upwardly about said axis from lowered position to an upper position by gradually withdrawing from the water toward said opposite end whereby the minnows are caused to migrate proximate to said opposite end of the netting means and being disposed thereat attendant to the netting means being lifted out of the water and said netting means positioned in upper position having an inclination from said opposite end to said one end whereby causing the minnows to progress gradually toward said one end, and metering means at said one end of said netting means for metering the minnows therefrom into the hands of the user.

2. The invention according to claim 1 wherein said netting means comprises a screen and said container comprises a top wall and vertical walls and defining an enclosure with said screen in the upper position thereof, and sealing means on the screen deflectably engaging said curved wall.

3. The invention according to claim 1 and said metering means comprising a spout connected to said one end of the netting means, and said netting means comprising a screen.

4. The invention according to claim 3 and said spout having a wall sloping downwardly into the container from the outlet end of the spout to provide a drain into the container upon said screen being in its upper position.

5. The invention according to claim 4 and said container having a top wall with a minnow-retainer opening therein, and a spring-biased closure flap mounted on said container in closing relation to said opening.

6. In a minnow bucket, a container for minnows with water therein, a netting screen pivoted within the container and swingable for netting minnows in the container from a lowered position within the container to an upper position out of the container with a downward slope toward one end whereby to cause the minnows flopping thereon to gravitate toward said end, and metering means at said one end of the screen for metering the minnows therefrom into the hands of the user, and said bucket in addition to said first-mentioned container comprising an outer container, and said metering means comprising a spout connected to the screen and swingable therewith, and operating linkage for pivoting said spout and screen connected between said containers and effective to swing the screen and spout to dispensing position attendant to lifting said inner container.

7. The invention according to claim 6 and means for vertically guiding the inner container within the first-mentioned container.

8. The invention according to claim 7, and said means comprising gibs on one container and vertically elongated slots on the other.

9. The invention according to claim 7 and said means comprising parallel links pivoted at one of their corresponding ends to one container and at their other corresponding ends to the other container.

10. A minnow container, a netting element, means pivotally mounting said element with respect to said container for swinging movement from a position within the container to a position out of the container for netting minnows therein, a metering spout at one end of said element for receiving minnows therefrom, link means operatively connected between the spout and said container for tilting the spout and said element about the axis of pivot of said element attendant to said element swinging to a position out of the container, and said means pivotally mounting said element about a generally horizontal axis, an inner container connected to said means and disposed within the aforesaid container, and means guidably interconnecting said containers for relative vertical movement.

References Cited
UNITED STATES PATENTS

| | | | |
|---|---|---|---|
| 372,124 | 10/1887 | Craig | 43—56 |
| 2,082,754 | 6/1937 | Peterson | 43—56 |
| 2,531,551 | 11/1950 | Brecht et al. | 43—4 |
| 3,039,225 | 6/1962 | Semelka | 43—56 |
| 2,474,745 | 6/1949 | Lewis | 43—56 |

HUGH R. CHAMBLEE, *Primary Examiner.*